June 8, 1926.
J. E. SPENCER
WINDSHIELD WING
Filed August 7, 1922
1,588,202
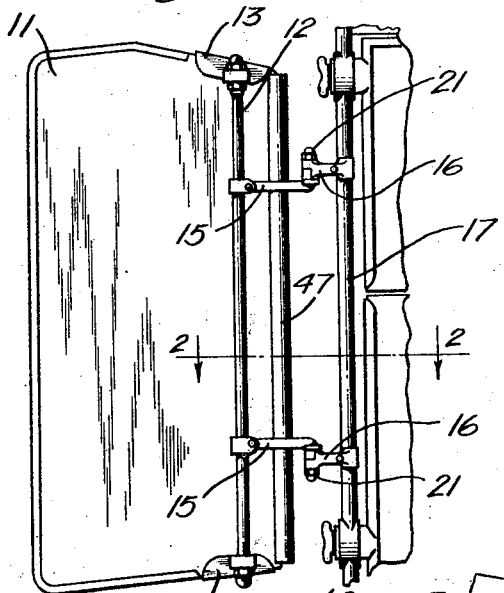
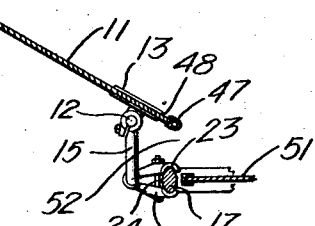
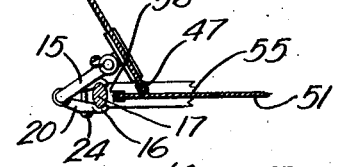
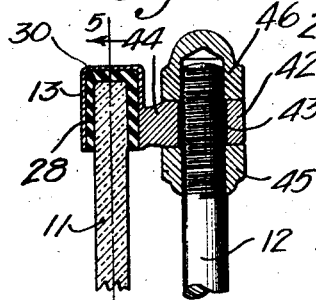
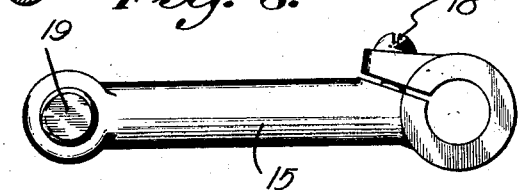
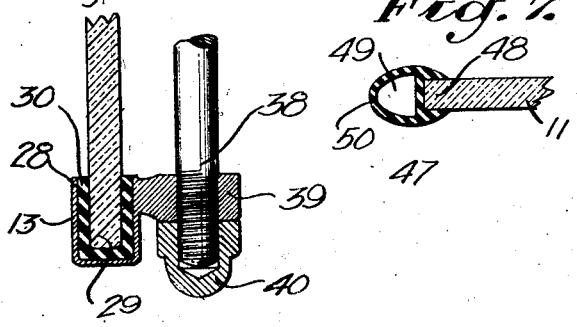
INVENTOR:
JOHN E. SPENCER,
BY
*Graham + Lewis*
ATTORNEYS.

Patented June 8, 1926.

1,588,202

UNITED STATES PATENT OFFICE.

JOHN E. SPENCER, OF LOS ANGELES, CALIFORNIA, ASSIGNOR TO A. CLIFF LILLIE, OF LOS ANGELES, CALIFORNIA.

WINDSHIELD WING.

Application filed August 7, 1922. Serial No. 580,032.

My invention relates to automobile accessories and equipment and relates particularly to auxiliary windshields or wind deflectors which may be mounted upon the sides of an automobile windshield.

It is an object of the invention to provide an improved form of windshield wing which may be conveniently secured upon the side members of a windshield frame and so mounted that it may readily be adjusted to different positions of extension.

It is also an object of the invention to provide with such a windshield wing a means whereby a tight closure may be formed between the windshield and the wing.

It is a further object of the invention to provide a novel means for attaching the supporting members to the glass plate constituting the deflector plate of the wing.

The specific advantages and further objects of the invention will be made evident hereinafter.

Referring to the drawing, which is for illustrative purposes only,

Fig. 1 is a view showing a windshield wing embodying my invention attached to a windshield.

Fig. 2 is a section taken upon a plane represented by the line 2—2 of Fig. 1, showing one of the positions in which the windshield wing is adapted to be maintained.

Fig. 3 is a sectional view similar to Fig. 1 showing the manner in which the wing may be swung back so that the edge thereof is brought into contact with the windshield, thus forming a closure therebetween by the means of a compressible rubber edge strip mounted upon the edge of the wing.

Fig. 4 is a fragmentary vertical sectional view illustrating the manner in which the supporting rod is attached to the deflector plate.

Fig. 5 is a section taken upon a plane represented by line 5—5 of Fig. 4, for the purpose of illustrating how the attachment members are deprived of lateral movement upon the deflector plate.

Fig. 6 is an enlarged plan view of one of the bracket members.

Fig. 7 is an enlarged fragmentary section illustrating the form of the compressible edge employed in my invention.

Fig. 8 is a section through a clamping stud.

As shown in Fig. 1 of the drawing, my invention comprises a glass deflector plate 11 having a deflector member or rod 12 mounted thereupon by means of attachment members 13 which are applied to the edges of the plate 11. Mounted upon the rod 12 are a pair of bracket arms 15 to which clamps 16, for mounting the wing upon the side bar 17 of the main windshield, are attached. The arms 15 are adapted to be clamped upon the bar 12 by set screws 18, as shown in Fig. 6 and the outer ends thereof are provided with vertically directed studs 19 upon which a pair of jaws 20 forming the clamp members 16 are pivoted and secured thereupon by nuts 21. The free ends of the jaws 20 are provided with circular grooves 23 which are adapted to enclose the edges of the side bar 17 of the windshield and are caused to be firmly held thereupon by bolts 24.

Wind deflectors of this general character are subjected to considerable wind pressure, and as they generally extend a considerable distance from their pivotal support, or hinged connection, with their supporting brackets, such hinged connection must necessarily exert sufficient frictional restraint against free movement of the deflector as to prevent accidental swinging thereof. In a measure, this is accomplished in the present invention by a tightening of the respective nuts 21 which exert an axial clamping of the clamp members or jaws 16 against each other and against the bracket arm 15. Depending entirely upon such clamping action, the nuts 21 would have to be screwed up so tightly as to in many instances cause a stripping of the threads, especially as the metal parts of devices of this character are usually made of brass or similar relatively soft material.

In the construction herein disclosed the clamp members or jaws 20 exert a frictional restraint upon the respective pivot stud 19, in addition to that exerted by the nut 21, this being due to the securing of said jaws upon the side bar 17 of the windshield frame. In this connection it will be pointed out that in tightening the bolt 24 to secure clamp 16 rigidly upon said bar 17, each jaw 20 thereof functions as a lever of the third class in which the end engaging the pivot stud 19 is the fulcrum, the opposite end being the weight end, and the intermediate portion engaged by the bolt 24 being the point of application of the power.

Thus a clamping of the jaw members 20 upon the side bar 17 of the windshield frame causes a transverse shearing strain to be exerted by the fulcrum ends thereof, upon the stud 19, this exerting a fixed initial restraint against free rotation of said stud, additional regulated restraint of such rotation being effected by the tightening of the nut 21 as above explained.

With this type of construction the nuts 21 do not have to be tightened to an extent which would be liable to cause a stripping of the threads.

The manner in which the attachment members 13 are secured to the plate 11 is shown in Figs. 4 and 5. These members 13 are each provided with a channel 28 somewhat wider than the thickness of the glass plate, and are adapted to be forced over the edges 29 of the plate 11 with a layer of compressive material 30 therebetween. This compressive material may be petroleum impregnated felt or a strip of rubber. A notch 32 is formed in the edge of the plate 11 in a position corresponding to a hump 33 formed upon the bottom 34 of the channel 28, so that when the attachment members 13 are placed upon the edge of the plate 11, the material 30 will be pressed into the depression 32 by the hump 33, thus providing an engagement between the member 13 and the plate 11 which will prevent this member 13 from sliding along the edge of the plate. The lower end 38 of the rod 12 is threaded into a boss 39 provided upon the lower attachment member 13, and a clamping nut 40 locks the two members firmly together.

The upper end 42 of the rod 12 is adapted to slide freely through an opening 43 provided in the boss 44 which is associated with the upper attachment member 13, and a nut 45 and a cap 46 are provided to secure this attachment member 13 upon the upper end of the rod 12 and to adjust the attachment member 13 to its proper position relative to the length of the plate 11, so that excessive pressure will not be applied through the screwing down of the cap 46 upon the rod 12 and causing the breakage of the glass.

As shown in Fig. 7 of the drawing, I provide an edged strip 47 which is adapted to be mounted upon the inner edge 48 of the plate 11 and has a longitudinal opening 49 extending therethrough so that a thin outer wall 50 is provided, this edge strip 47 having a utility which will be hereinafter described.

The normal position of the windshield wing is shown in Fig. 2, in which the brackets 15 are illustrated in positions perpendicular to the extension of the windshield 51 upon which the wings are mounted with the brackets in this position. The plate 11 may be adjusted to any desired position of angularity, leaving a space 52 between the edge 48 of the wing and the closure for ventilation. If no ventilation is desired, or in event of rain, the arms 15 may be swung over into the position in which they are shown in Fig. 3. The edge strip 47 may then be brought against the glass plates 55 of the windshield 51 to form a tight closure therewith which will effectually prevent the passage of air or water through the space 56 between the edges of the plates 55 and the side bars 17 of the windshield 51. The compressibility of the strip 47 contributes to the forming of a watertight closure against the plates 55.

The hereinbefore described manner of mounting the bar 12 upon the deflector plates 11 provides for the correct spacing of the attachment members 13 and eliminates the institution of stresses within the plate which ordinarily makes the plates susceptible to shattering by the vibrations of the body of the automobile which are encountered in ordinary driving and which are sometimes derived from the operation of the motor. Also the use of a layer of compressible material between the members 13 and the plates 11 damps the passage of vibrations to the plates 11 and absorbs certain of the pressure which might be brought to bear by the improper adjustment of the nut 45 and the cap 46.

I claim as my invention:

1. In a device of the nature disclosed, the combination of: a pair of relatively spaced bracket arms each having near its inner end an integral vertical pivot stud; a deflector member hingedly supported on the outer ends of said arms; and a pair of clamps, one associated with each respective bracket arm, each clamp comprising two jaw members and each jaw member constituting a lever of the third class having at one end an opening to receive the pivot stud of the associated bracket arm, the opposite end of each jaw member being formed to clamp against a support to which the device is to be applied; a bolt means for each clamp, each bolt means engaging the intermediate portions of the companion pair of jaw members to draw said members together to grip said support and cause an initial frictional restraint on the cooperating pivot stud; and a nut on each pivot stud for frictionally clamping the jaw members to the respective bracket arm.

2. In a device of the nature disclosed, the combination of: a supporting structure comprising a bracket arm having near its inner end an integral pivot stud; a clamp means hingedly connected with said stud and comprising two opposed jaw members, each constituting a lever of the third class and having at one end an opening to receive the pivot stud, the opposite end thereof being formed to clamp against a support to which the device is to be applied, and means engaging the intermediate portions of both jaw members to draw said members to clamping engagement upon said support and to cause a frictional restraint upon the pivot stud; and a nut on said pivot stud for frictionally clamping the jaw members to the bracket arm.

In testimony whereof, I have hereunto set my hand at Los Angeles, California, this 31st day of July, 1922.

JOHN E. SPENCER.